Patented Feb. 20, 1934

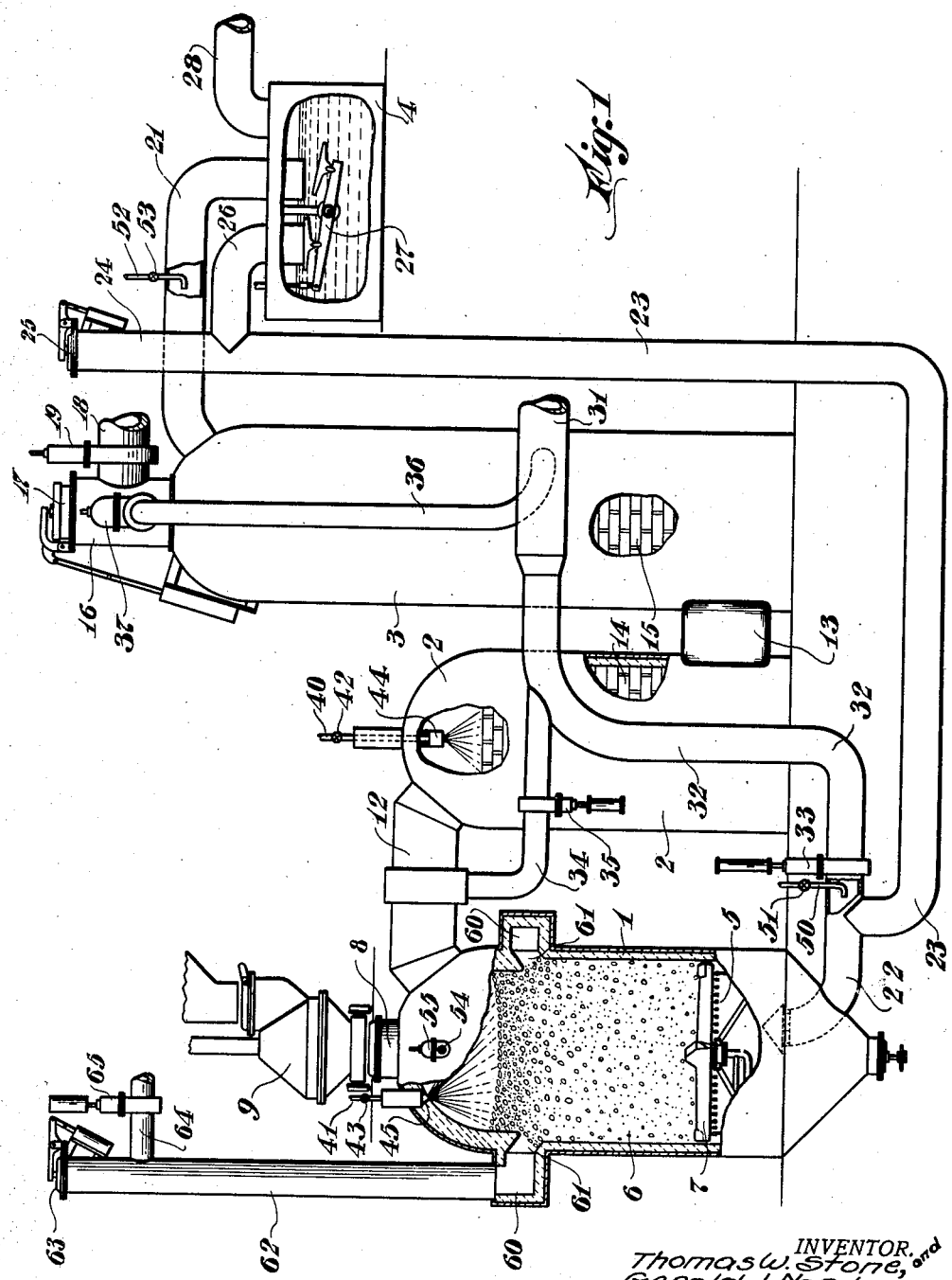

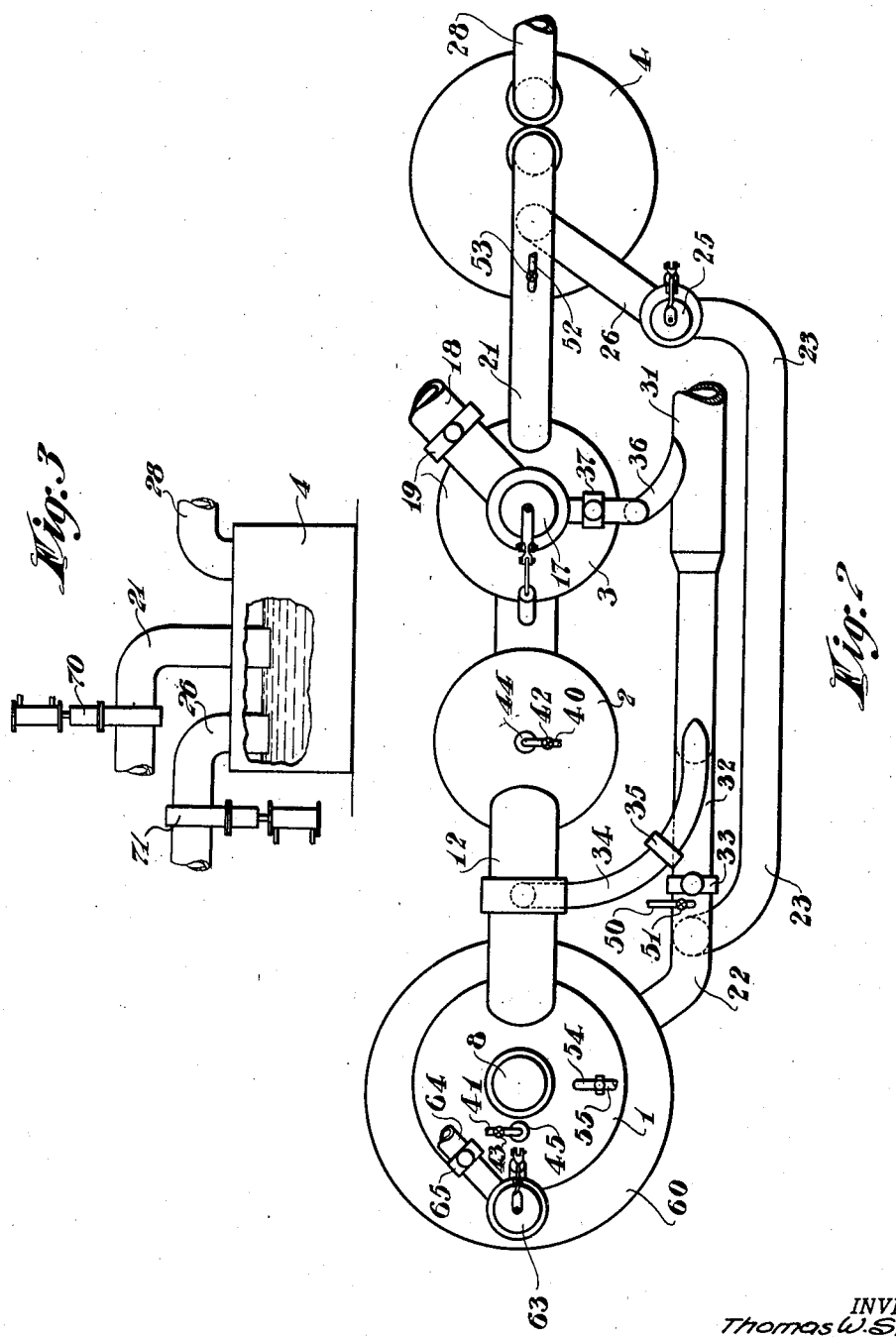

1,947,792

UNITED STATES PATENT OFFICE 1,947,792

PROCESS OF MAKING CARBURETED WATER GAS

Gerald J. Nordmeyer and Thomas W. Stone, Fort Wayne, Ind., assignors to The Koppers Company of Delaware, a corporation of Delaware, and to The Western Gas Construction Company, a corporation of Indiana Application May 16, 1931. Serial No. 537,968

7 Claims. (Cl. 48—208)

Our invention relates to the manufacture of carbureted water gas, and more particularly to process for the manufacture of carbureted water gas in which water gas generated by the passage of steam through a bed of incandescent carbonaceous fuel, is carbureted at elevated temperatures by the addition of heavy oil.

As is well known, carbureted water gas is ordinarily made in an intermittent manner, that is to say in a series of cycles, each of which cycles comprises principally a "blow" or heating period, and a "run" or gas-making period. The blow period is carried out by blasting a bed of carbonaceous fuel to incandescence, removing the resultant air-blast gases and conducting them through carbureting apparatus, which comprises a carburetor and a superheater the interior of each of which is partially filled with checkerbrick.

During the passage of the air blast gases through the carbureting apparatus, additional or secondary air is admitted, causing the combustion of the air-blast gases. In this manner the carbureting apparatus is brought to a high temperature by means of the heat of combustion or sensible heat of the air-blast gases.

In the subsequent steam run period, steam is passed through the incandescent fuel and all or a portion of the resultant water gas is conducted through the highly heated carbureting apparatus where oil is introduced to carburet and enrich the gas. This oil is vaporized, cracked, and finally fixed as a permanent gas in the stream of water gas, thereby forming carbureted water gas, which is then withdrawn for use as fuel or illuminating gas. This cycle of operation is repeated, carbureted water gas thus being produced intermittently.

At the present time the greatest problem confronting the manufacturers of carbureted water gas is the use of heavy oil, such as bunker oil. The gas oils which have been used for carbureting purposes in the past are now becoming more expensive and less available. There is the necessity of reducing manufacturing costs to a point where carbureted water gas can successfully compete with natural gas, oil refinery gas and other gases now available. It has become therefore of the greatest importance for the manufacturer of carbureted water gas to be able to employ for carbureting purposes inexpensive heavy oils of low grade, such as the so-called "bunker oils".

However, when it has been attempted to use such oils for carbureting purposes in the manufacture of carbureted water gas great difficulties have been encountered, the principal difficulties arising from the extremely high coke content and the low volatility of such oils. Carbureted water gas processes which have been entirely satisfactory insofar as the use of gas oil having less than 1% coke content is concerned have proved entirely incapable of handling heavy fuel oils, the coke content of which ranges from 6% to 20%.

In instances where such oil has been substituted for gas oil in plants previously operating satisfactorily on gas oil, without other change in the process or apparatus, the carbon deposits formed in the carbureting apparatus have been so excessive that the passages through the checkerbrick of the carburetor and superheater became plugged with carbon deposit within a few hours, frequently necessitating a shutting down of the apparatus before one day's operation had been completed. Moreover, this shutting down was necessarily followed by removal and replacement of the checkerbrick in the carburetor, an expensive, tedious and time-consuming operation greatly increasing the manufacturing cost of the gas. Moreover in such instances the oil cracking efficiencies and fuel economies obtained have been poor.

While a number of processes have been devised with the handling of such heavy oils in view, none of such processes, prior to that of applicants', can be said to be entirely satisfactory. It has been proposed, for example, to return to the use of the checkerless carburetors disclosed and used earlier in the history of the art, but the use of a separate checkerless carburetor is open to a number of marked disadvantages. In the first place the removal of checkerbrick greatly reduces the thermal capacity of the set and makes it difficult to introduce the necessary quantity of oil, this difficulty being enhanced by the fact that the oil employed is more difficult to volatilize and crack than the lighter oils previously used. Moreover, the removal of the checkerbrick from the carburetor will obviously result in the carrying over of a considerable portion of the carbon produced into the superheater checkerbrick, thus decreasing the life of the latter.

It has been found that the use of a separate checkerless carburetor necessitates daily cleaning periods of an hour or more in duration in which the carbon deposited in the bottom and on the sides of the carburetor must be removed by hand. Despite statements in the literature to the contrary, this carbon deposits in the bottom of the carburetor in a hard, tenacious form, making such removal difficult and tedious.

It has also been proposed, either in conjunction with the use of a separate checkerless carburetor or alone, to introduce a large portion or all of the necessary oil directly into the top of the generator, combined with so-called "marginal blasting" of the upper portion of the fuel bed onto which the oil is sprayed, this marginal blasting being accomplished by introducing an additional or secondary forward air blast to the upper portion of the fuel bed. However, such marginal blasting methods have proved unsatisfactory and have not, to the best of applicants' knowledge, obtained any widespread use by reason of their known disadvantages.

Such reverse-air-blasting methods as have been suggested or employed in the past have been unsatisfactory for a number of reasons. The removal of reverse-air-blast gases at the top of the carburetor or generator is entirely unsatisfactory by reason of the great loss of fuel economy. It will moreover be obvious that such a procedure involves the employment of a period of idleness so far as the manufacture of gas is concerned, since during such period no gas is being made nor is any other useful purpose accomplished except mere carbon removal.

Finally, such reverse-air-blasting methods as have been employed in the prior art have been necessarily confined to the use of gas oils and as so used are entirely unsatisfactory for the handling of heavy oil for reasons that will appear more fully hereinbelow and have failed to accomplish a satisfactory solution of the heavy oil problem, and it is only after extended experimentation, trial and invention that we have been able to develop the satisfactory solution of the problem contained in the invention or inventions set forth herein.

In order for such an entirely satisfactory solution of this heavy oil problem to be accomplished, it has been clear to us that the solution must be dominated by certain considerations. In the first place the capacity of the set must not be decreased and it must be possible to produce gas of satisfactory thermal value at proper oil and fuel economies. The deposit of carbon in the carbureting apparatus must be consumed automatically during the regular course of the cycle so that no shutdown periods for carbon removal are necessary. Moreover, the carbon deposit should be utilized as fuel, preferably in such manner as to assist in maintaining the desired high temperature conditions in the generator fuel bed and carbureting apparatus.

The proper balance of temperatures throughout the set must be maintained in order to carefully avoid that operating condition which makes gas too high in heat value to be wasted and yet too high in inerts to be delivered to the holder. Moreover, it is highly desirable to provide a cycle of gas making operations in all portions or periods of which some useful purpose other than the mere removal of carbon is being accomplished.

In view of the above, therefore, the general object of our present invention is the provision of a process for the manufacture of carbureted water gas in which heavy oil is employed for carbureting purposes and which shall be free from disadvantages such as those set forth hereinabove and effective to provide a solution for the problem of the utilization of heavy oil in the manufacture of carbureted water gas.

A further object of our invention is to provide a process for the manufacture of carbureted water gas from heavy oil in which carbon deposited from the heavy oil is removed during the ordinary cycle of operation without necessitating short periods for the removal of such carbon from the apparatus, and without lengthening the cycle.

A third object of our invention is to provide a process for the manufacture of carbureted water gas from heavy oil in which carbon deposited from the heavy oil is advantageously employed as fuel in the process.

A further object of our invention is to provide a process of the character indicated in which regulation of temperatures throughout the apparatus and more particularly in the fuel bed and carburetor within an efficient range is facilitated, and in which improved fuel and oil economies may be obtained.

A still further object of our invention is to provide a method of the character indicated that is simple in operation and does not require inclusion of periods or operations of little utility in the operating cycle.

Our invention has for further objects such other operative advantages and improvements as may be hereinafter found to obtain.

Our invention may be employed with existing carbureted water gas apparatus, although as will be apparent hereinbelow, certain changes as compared with the apparatus employed for the utilization of gas oils in the past may be desirable. Moreover, as will also be apparent hereinbelow, various changes may be made in the apparatus for certain special effects and advantages in accordance with the present invention.

Our invention does not contemplate a departure from the fundamental water gas operating cycle of intermittent blow and run, although as will be apparent hereinbelow, the contemplated cycle or cycles of operation differ materially as to the nature and extent of various portions of the cycle as compared with prior cycles employed for the manufacture of carbureted water gas from gas oil and the like.

Our invention contemplates primarily the use of a reverse-air-blast in a novel and efficacious manner which by actual experimentation has been found to be capable of obtaining the objects and advantages herein set forth, and differing materially from such reverse-air-blasting as has heretofore been employed or proposed. In prior operation such reverse-air-blast as has been employed has either been wasted to the atmosphere at the top of the carburetor or necessarily confined to extremely brief periods of the cycle.

According to our present invention a reverse-air-blast is employed which is of considerable duration and amount and which traverses at least a portion of the fuel bed. Whereas such previous reverse-air-blasting has been shown to be incapable of handling such carbon deposits as are incident to the use of heavy oil, our present method is capable of adequately handling this carbon deposit. Thus not only may the apparatus be kept free of carbon and in good operating condition over extended periods but the fuel value of this carbon may be realized in an advantageous manner and other advantages obtained.

Our invention further contemplates, where a three-shell apparatus is employed, the division of the oil used for carbureting between the carburetor and generator combined with the use of a reverse air blast in such manner and to such extent as to provide not only for the combustion of all the carbon produced during the carburetion of the gas with heavy oil but also to provide sufficient combustion in the generator fuel bed, and more particularly the upper portion thereof upon which some of the heavy oil is sprayed, to balance the temperature reduction caused by the introduction of heavy oil directly to the generator. Our invention also contemplates where necessary or desirable, the employment of secondary air between the top of the carburetor and generator to supplement the reverse-air-blast introduced at the top of the superheater.

While according to our invention the heavy oil is ordinarily introduced during such time only as steam is being passed upward through the fuel bed, oil may also be introduced, where so desired and as pointed out more fully hereinbelow, during the period in which steam is being passed downward through the fuel bed.

Our invention, in addition to providing for the use of a reverse-air-blast in the manner and to the extent described, also provides, where so desired, for the removal of the reverse-air-blast gases thereby produced at an advantageous point where these gases are of such nature that the optimum fuel economy is obtained while at the same time an extremely advantageous balance and regulation of temperature conditions within the set is made possible.

This preferred method is accomplished by withdrawing the reverse-air-blast gases at an intermediate level in the generator fuel bed immediately below the upper portion of the fuel bed, the temperature of which is affected by the introduction of oil thereto, or where the reverse air gases contain a minimum of combustible gas, i. e., carbon monoxide.

In this manner not only is the carbon deposit within the carbureting apparatus advantageously employed to increase the temperature within the carbureting apparatus to such extent as to enable the proper use of heavy oil for carbureting purposes, but also sufficient combustion in the upper portion of the fuel bed is set up to balance the heat reduction due to the introduction of heavy oil thereto, at least a considerable part of this combustion being that of the carbon deposit obtained from the introduction of heavy oil into the generator.

In general, our invention contemplates a material increase in the extent of the reverse-air-blasting operation over such reverse-air-blasting operations as have been employed as regular portions of operating cycles heretofore, together with a generally corresponding reduction in the amount of air used in normal forward blasting period, and also the discharge of the greater portion of the reverse air blast gases to the atmosphere or to waste heat recovery apparatus, especially where such gases are withdrawn in a condition especially suitable for use in such waste heat recovery apparatus. However, our invention also contemplates the use, where desired, of brief blow run periods in which the reverse-air-blast gases, when the latter are of sufficient calorific value, are withdrawn and commingled with the carbureted water gas made during other portions of the cycle.

Our invention also contemplates, especially when the above-mentioned air-blast offtake located at an intermediate level in the fuel bed is employed, the simultaneous use of forward-air-blast and reverse-air-blast, with appropriate apparatus provision therefor, as will be more fully explained hereinbelow.

As will be apparent hereinbelow, our invention while capable of being carried out in three-shell apparatus of more or less conventional design is capable of being employed with extremely advantageous results in two-shell sets and other installations where all or a part of the heavy oil is sprayed into the generator or into a portion of the generator serving substantially as a carburetor, such use constituting certain of the subject matter of the copending applications of Gerald J. Nordmeyer, Serial No. 537,911 and of George I. Koons and Malcolm H. Merritt, Serial No. 537,969, both filed concurrently herewith.

In order that our invention may be fully set forth and understood we now describe with reference to the accompanying drawings the preferred manner and form in which our invention may be practiced and embodied. In these drawings, Figure 1 is a view partly in elevation and partly in vertical section of apparatus for manufacturing carbureted water gas in accordance with the present invention, certain parts being more or less diagrammatically shown;

Fig. 2 is a plan view of the apparatus shown in Fig. 1; and

Fig. 3 is a view partly in elevation and partly in vertical section of an alternative form of a portion of the apparatus shown in Figs. 1 and 2.

Similar characters of reference designate similar parts in each of the views of the drawings.

Referring to these drawings, there is shown a form of apparatus for manufacturing carbureted water gas comprising principally a generator 1, carbureting apparatus which in this instance comprises a carburetor 2 and a superheater 3, and a gas offtake seal or tar batter 4. The generator 1 is provided with a grate 5 adapted to support a bed of carbonaceous fuel 6, and preferably, although not necessarily, with means such as a revolving beam 7 for continuously removing ash or clinker from said fuel bed 6. Fuel is introduced to the generator through a charging opening 8, the introduction of the fuel being preferably, but not necessarily, accomplished by an autommatic charging device 9 located immediately above the charging opening 8, said charging device 9 being omitted for convenience from Fig. 2.

The upper portions of the generator 1 and the carburetor 2 are connected by means of a conduit 12, preferably so designed as to provide a permanently free passage for gas between the generator and carburetor. The carburetor 2 and the superheater 3 are connected through an open conduit 13. The interiors of the carburetor 2 and the superheater 3 are partially filled with checkerbrick 14 and 15, respectively, this checkerbrick being preferably so spaced within the carburetor 2 and superheater 3 as to provide minimum obstruction to the flow of gas therethrough with maximum heat storage capacity.

The upper portion of the superheater 3 is provided with a stack T 16 having a stack valve 17 for discharge of gases to the atmosphere and also having, where so desired, a connection 18 having a valve 19 leading to a waste heat boiler or other waste heat recovery device (not shown). The top of the superheater 3 is provided with a conduit 21 leading to the gas offtake seal 4 and terminating below the level of the sealing liquid therein.

The base of the generator 1 is provided with a conduit 22 for introduction of gases into or removal of gases from the generator fuel bed 6, as the case may be, said conduit 22 communicating with a conduit 23 which bypasses the carburetor 2 and superheater 3 and is provided with a stack connection 24 having a stack valve 25, and also with a conduit 26 leading to the gas offtake seal 4 and terminating below the level of sealing liquid therein.

Within the gas offtake seal 4 there is provided a valve device 27 adapted to alternately and oppositely open and close the conduits 21 and 26 in accordance with the desired sequence of operations. The gas offtake seal 4 is also provided with a gas offtake 28 leading to a gas holder or to the distribution system. It will be understood that one purpose of the gas offtake seal 4 and valve 27 is to insure against passage of gas in a reverse direction from the gas offtake 28 into the carbureted water gas set and another purpose of the same is to provide for the reversal of flow through the generator, carburetor and superheater.

In Fig. 1 the valve 27 is shown in position for the passage of gas in a forward direction through the generator, carburetor and superheater in the order named and thence through the gas offtake seal 4 and gas offtake 28, while preventing flow of gas from the base of the generator to the gas offtake seal.

Air blast for the operation of the set is provided from an air-blast manifold 31 which is provided with a primary-blast pipe 32 having a valve 33 and leading through the conduit 22 into the base of the generator 1, with a secondary-air-blast pipe 34 having a valve 35 and communicating with the generator-carburetor connection 12, or alternatively with the top of the carburetor 2, and also with a reverse-air-blast pipe 36 having a valve 37 and communicating with the stack T 16, or alternatively leading directly into the upper portion of the superheater 3.

Heavy oil for carbureting purposes is supplied from suitable storage and heating facilities (not shown) through conduits 40 and 41 having valves 42 and 43, respectively, and leading to sprays 44 and 45 located in the top of the carburetor 2 and the top of the generator 1, respectively.

Since a considerable portion of the heavy oil used for carbureting the gas is introduced to the generator, the checkerbrick 14 in the carburetor 2 may be reduced, when so desired, in proportion to the division of the total oil used between the sprays 44 and 45 in the carburetor 2 and generator 1, respectively.

We further provide an uprun steam connection 50 having a valve 51 and communicating through the connection 22 with the base of the generator 1, a backrun steam connection 52 having a valve 53 and communicating with the connection 21, or alternatively leading directly into the upper portion of the superheater 3, and also (for use when so desired), a downrun stream pipe 54 having a valve 55 and communicating with the upper portion of the generator 1, or alternatively with the generator-carburetor conduit 12.

The generator 1 is preferably, but not necessarily, provided with a reverse-air-blast offtake manifold 60 communicating through a plurality of ports 61 with the generator fuel bed. The ports 61 may be of any desired number according to the size of the generator 1, and are preferably located on a circle located at an intermediate level of the fuel bed 6 and preferably from two to five feet below the top of the fuel bed, this level being readily determined by analysis of reverse-air-blast gases passing downward through the generator fuel bed 6 to determine that point at which said gases contain a minimum content of carbon monoxide.

In this connection it may be noted that variations in the depth of the generator fuel bed must be taken into account in locating the ports 61. Where mechanical charging apparatus is available and the generator is charged during every operating cycle, the level of the top of the fuel bed 6 will remain fairly constant, but where hand-charging is practiced and relatively large amounts of fuel are charged at comparatively widely separated intervals of several cycles, the level of the top of the fuel bed 6 may vary considerably. In any event, however, the ports 61 will be located with reference to the average height of the fuel bed, bearing in mind the effect of temperature changes during the charging cycle upon the carbon monoxide content of the reverse-air-blast gases.

The reverse-air-blast offtake manifold 60 is provided with a stack 62 having a stack valve 63 and may also be provided where so desired with a branch 64 having a valve 65 and leading to a suitable waste heat boiler or other waste heat recovery apparatus (not shown).

With respect to the aforesaid apparatus, we now describe for purposes of illustration a preferred operating cycle according to which the process of our present invention may be advantageously carried out. This cycle consists of the following periods and operations set forth hereinbelow.

1. Forward-air-blast period

During this period all steam and oil valves are closed, as are the auxiliary stack valves 25 and 63, while the reversing valve 27 is held in the position in which it is shown in Fig. 1. The reverse-air-blast valve 37 is also closed, the primary-air-blast valve 33 being open. Air is admitted to the base of the generator 1 and passes upward through the fuel bed 6. The resultant air-blast gases then pass through the conduit 12 to the top of the carburetor 2.

After the first few seconds of this period additional air is admitted by opening the secondary-air-blast valve 35 to admit at least sufficient air to cause the combustion of substantially all of the carbon monoxide content of the air blast gases coming from the generator 1. The resultant air-blast gases and gases of combustion pass downward through the carburetor 2 through the conduit 13 upward through the superheater 3, meantime yielding the greater portion of their heat of combustion and sensible heat to the checkerbrick 14 and 15, and finally pass through the open stack valve 17 into the atmosphere or through the open valve 19 and connection 18 to the waste heat boiler (not shown).

When the desired temperature conditions, as determined largely by the nature of the heavy oil to be employed for carbureting purposes, have been attained, the forward-air-blast period is discontinued by closing the valves 33 and 35 and the valve 17 or 19 as the case may be. A reverse-air-blast period then follows.

2. Reverse-air-blast period

The stack valve 17 and valve 19 being closed, the valve 27 is reversed from its position during the previous forward-air-blast period, and reverse-air-blast is admitted to the top of the superheater 3 by opening the reverse-air-blast valve 37. Ordinarily, for the first few seconds of this period, the stack valve 25 and also the stack valve 63 (and valve 65 if provided,) are held in the closed position. The reverse-air-blast passes downward through the superheater 3, becoming highly superheated through contact with the checkerbrick 15 and causing the combustion of any carbon deposited thereon and then passes in this highly heated condition through the conduit 13 into the carburetor 2.

Passing upward through the checkbrick 14 within the carburetor 2 the reverse-air-blast gases cause the combustion of substantially all carbon deposited upon the checkerbrick 14 and the walls of the carburetor 2 in the carbureting period of the previous cycle, leaving at the most not more carbon than can be consumed in the subsequent steam backrun period when the latter is employed. The resultant reverse-air-blast gases pass through the conduit 12 into the generator 1 driving ahead of it any air-blast gases produced in the previous period and still remaining in the generator 1, which gases may, as indicated above, for a brief blow run period of a few seconds be withdrawn through the gas offtake 28 and commingled with carbureted water gas produced during other portions of the cycle.

As soon as this brief blow run period is accomplished the stack valve 25 or the stack valve 63, (or, if a waste heat boiler is provided, the valve 65) is opened, thus permitting the discharge of the reverse-air-blast gases to the atmosphere or to the waste heat boiler as the case may be.

As hereinabove set forth, it is preferred to employ the stack valve 63 or the valve 65 for this purpose rather than the stack valve 25, in order that the reverse-air-blast gases may pass only through the upper portion of the fuel bed 6 and be withdrawn at a point where they contain the minimum carbon monoxide content. In the upper portion of the fuel bed during the reverse-air-blast period the reactions favor the formation of carbon dioxide, whereas if the reverse-air-blast gases are permitted to traverse the entire length of the fuel bed, carbon dioxide present in the reverse-air-blast gases entering the generator 1 or formed during the passage of the reverse-air-blast gases through the upper portion of the fuel bed 6 will tend to be converted to carbon monoxide in the lower portion of the fuel bed. This would result in producing a gas which is ordinarily of too high calorific value to be discharged to the atmosphere without loss of fuel economy and too high in inert gases, such as nitrogen and carbon dioxide, to be included for other than a very brief period in the make.

During this period, as hereinabove set forth, at least sufficient air is employed to insure the combustion of the carbon deposit within the carbureting apparatus, and more particularly on that portion of the checkerbrick nearest the point of oil admission and it is desirable to provide additional air in such quantity as to cause sufficient combustion in the upper portion of the fuel bed 6 to balance the heat reduction caused by the introduction of heavy oil to the top of the generator during other portions of the cycle. It will be obvious that the combustion taking place within the carburetor and also to a considerable extent within the upper portion of the generator during this reverse-air-blasting period is largely that of carbon derived from the decomposition of heavy oil employed for carbureting purposes in a previous cycle, so that the fuel value of this carbon is recovered in a particularly advantageous manner and to a valuable extent.

The introduction of air during the reverse-air-blast period with the above in view may be accomplished solely through the reverse-air-blast connection 36 and valve 37, but in many instances it will be desirable to introduce through the connection 36 only sufficient air to insure the combustion of carbon within the carbureting apparatus and to introduce such additional air as may be necessary to cause the desired combustion in the top of the generator fuel bed 6, through the connection 34 and the secondary air blast valve 35 which may be opened for this purpose.

This mode of operation is ordinarily preferred by reason of the fact that it avoids the passage of excessive air through the carbureting apparatus, thus eliminating any undesirable cooling effect upon the carbureting apparatus which might be caused by excess air and also reducing the total back pressure exerted by the apparatus upon the reverse-air-blast, which in turn makes it possible to blast more air through the apparatus in a shorter time.

Just before the conclusion of this reverse-air-blast period the stack valve 25 or the stack valve 63 or the valve 65 (depending upon which one of these valves has been in the open position) may be closed, thus providing for a brief blow run period in which the reverse-air-blast gases (which at this time may contain considerable quantities of carbon monoxide) are permitted to pass through the conduits 22, 23 and 26 into the gas offtake seal 4 and out through the gas offtake 28 to be commingled with carbureted water gas produced during other portions of the cycle.

A steam run then follows which is divided into three periods, the first of which is a steam uprun period.

3. Initial steam uprun period

With all stack valves and air valves closed and the reversing valve 27 placed in the position in which it is shown in Fig. 1, steam is admitted to the base of the generator 1 through the connections 50 and 22 by opening the steam uprun valve 51.

The steam passes upward through the generator fuel bed 6, the resultant water gas being conducted through the conduit 12 into the carburetor 2 and then passes through the carburetor 2, conduit 13, superheater 3 and conduit 21 to the gas offtake seal 4 and out through the gas offtake 28.

During substantially the whole of this period, heavy oil, preferably at a high temperature and considerable pressure (for example a temperature of 200° F. and a pressure of 225 pounds per square inch or whatever pressure and temperature are necessary in order to provide a proper flow of oil,) is introduced through the sprays 44 and 45 to the top of the carburetor 2 and the generator 1. The heavy oil discharges upon the highly heated checkerbrick 14 and the highly heated upper portion of the generator fuel bed 6, respectively, and during the course of this introduction and discharge is volatilized and cracked. The resultant oil gases and vapors commingle with the water gas coming from the generator fuel bed 6 and are permanently fixed by contact with the highly heated checkerbrick 15 within the superheater 3.

As this is the only portion of the cycle in which oil can be admitted for carbureting purposes without reducing the specific gravity of the final gas, it is necessary, except in the instance noted hereinbelow, to accomplish a sufficient carburetion of the uprun water gas produced during this period to so provide that the ultimate mixture of carbureted and uncarbureted gases passing through the gas offtake 28 during the entire course of the cycle is of sufficient calorific value, for example from 500 to 530 B. t. u. per cubic foot. Hence the desirability, when employing heavy oil for carbureting purposes, of introducing the heavy oil to both the generator and carburetor.

Obviously the proportioning of the oil between the generator and carburetor during this period will vary according to the results desired as well as according to the nature of the oil and the nature of the cycle employed. In the specific instance given hereinbelow, approximately equal quantities of the oil are introduced to the carburetor and to the generator, for example, 19 gallons of heavy oil per run to the carburetor and 21 gallons of heavy oil per run to the generator, the final gas in this instance having a calorific value of at least 510 B. t. u. per cubic foot.

In order to maintain the proper conditions within the generator fuel bed it is necessary to reverse the direction of steam flow to the generator fuel bed during a considerable portion of the total steam run. This is preferably accomplished by following the foregoing period with a steam backrun period.

4. Steam backrun or downrun period

In going from the steam uprun period to a steam backrun period the uprun steam valve 51 is closed, the reversing valve 27 is placed in a position opposite to that in which it is shown in Fig. 1, and the backrun steam valve 53 is opened. Steam now flows through the backrun steam connection 52 and the conduit 21 into the top of the superheater 3 and passes downward through the superheater 3, conduit 13 and upward through the carburetor 2. During the course of the backrun steam it becomes highly superheated by contact with the checkerbrick 15 and 14 within the superheater 3 and carburetor 2, respectively, and may also react with any small quantities of carbon remaining upon the checkerbrick 15 or 14 to form water gas, thereby consuming such carbon.

The resultant highly superheated backrun steam, which may include small quantities of water gas produced in the manner just described, then passes through the conduit 12 into the top of the generator 1 and passes downward through the generator fuel bed 6. The resultant backrun water gas then passes from the base of the generator 1 through the conduits 22, 23 and 26 into the gas offtake seal 4 and is withdrawn through the gas offtake 28 and commingled with water gas and blow run gas produced during other portions of the cycle.

Where the specific gravity of the final gas is otherwise somewhat high, it may be desirable to introduce heavy oil to the generator fuel bed during this period. By reason of the fact that the oil vapors and gas thus produced are carried downward through the heated fuel bed and are subjected to considerable cracking the effect of such oil introduction is to decrease the specific gravity of the gas while increasing the capacity of the apparatus.

It will be obvious to those skilled in the art that while the steam employed during this period is preferably introduced through the connection 52, such steam may in fact be introduced at the top of the generator through the connection 54 or at any other point between the connections 52 and 54.

This virtually completes the major portion of the cycle, but as the base of the generator now contains a considerable quantity of backrun water gas it is desirable before going into the forward air blast period of the next cycle to accomplish a final steam uprun period and preferably also an air purge period.

5. Final steam uprun period

The reversing valve 27 being placed in the uprun position in which it is shown in Fig. 1, the valve 53 being closed and the valve 51 open, steam is admitted to the base of the generator and passes upward through the generator fuel bed 6 and through the carburetor and superheater as in the previous initial steam uprun period. As soon as sufficient steam has been admitted in this manner to insure that no water gas remains in the base of the generator 1 this period may be discontinued, being followed by an air purge period.

6. Air-purge period

To inaugurate this period no other change is necessary than to close the uprun steam valve 51 and open the primary-air-blast valve 33. The air blast now enters the base of the generator 1 and passes upward through the fuel bed 6, driving ahead of it steam remaining in the base of the generator 1 and water gas remaining in the remaining portions of the apparatus at the conclusion of the previous final steam uprun period. During this period the stack valve 17 (and the waste heat boiler valve 19, if the latter is provided,) is kept closed, the reversing valve 27 being held in the uprun position so that the water gas remaining in the set is driven by the air blast into the gas offtake seal 4 and passes through the gas offtake 28.

As soon as the set is clear of water gas, as determined by experimentation in the usual manner, the stack valve 17 or the waste heat boiler valve 19, as the case may be, is opened and the forward-air-blast period of the next cycle immediately proceeds.

While it will be obvious to those skilled in the art that the actual quantities of air, steam and oil and the length of the various periods of the cycle will depend upon factors varying from set to set and from plant to plant, nevertheless the following summary of operating conditions in one actual installation will be of value as illustrative of the practice of our present invention. (These figures have been obtained in actual operation of a standard carbureted water gas set having a nine foot generator and equipped with connections for reverse-air-blast and backrun steam, but not in this instance provided with the reverse-air-blast offtake located at an intermediate point of the fuel bed, as shown at 60 and 61 in Fig. 1 of the drawings.)

1. *Forward-air-blast:*
Primary air 60 seconds at 9500 cu. ft. per minute
Secondary air 52 seconds at 2300 cu. ft. per minute
2.—*Reverse-air-blast:*
(a) Blow run 4 seconds at 5500 cu. ft. of air per minute
(b) Reverse-air-blast to stack 35 seconds at 6000 cu. ft. of air per minute
(c) Blow run 6 seconds at 5500 cu. ft. of air per minute
3.—*Initial steam uprun:*
65 seconds at 145# of steam per minute
4.—*Steam backrun:*
60 seconds at 135# of steam per minute
5.—*Final steam uprun:*
23 seconds at 145# of steam per minute
6.—*Purge:*
5 seconds at 8200 cu. ft. of air per minute.

While the above figures represent an actual operating instance and are believed to be relevant as disclosing to a considerable extent the actual nature of a satisfactory cycle, they are not to be taken as indicative of the best results obtainable by means of our process nor are they to be taken as establishing a fixed rule for the operation of other apparatus under different conditions as will readily be appreciated by those skilled in the art.

It may be pointed out that the above cycle differs materially from a cycle which would be satisfactory when using gas oil for carbureting purposes in the same apparatus, such difference residing principally in the extent and duration of the reverse air blasting period as well as in the disposition of the resultant gases. By way of comparison such a standard gas oil cycle is given hereinbelow:

1.—*Forward-air-blast:*
 105 seconds at 7500 cu. ft. of air per minute including 97 seconds carburetor blast at 3300 cu. ft. of air per minute
2.—*Reverse-air-blast:* (Blow run)
 8 seconds at 4500 cu. ft. of air per minute
3.—*Initial steam uprun:*
 70 seconds at 130# of steam per minute
4.—*Steam backrun:*
 71 seconds at 140# of steam per minute
5.—*Final steam uprun:*
 12 seconds at 130# of steam per minute
6.—*Purge:*
 5 seconds at 6700 cu. ft. of air per minute.

As stated hereinabove, if the latter cycle were employed in conjunction with the use of heavy oil for carbureting purposes the set would plug up in a few hours' time on account of carbon deposited on the checkerbrick of the carbureting apparatus and which the aforesaid cycle of operations is incapable of consuming.

According to the present invention, we prefer to employ a reverse-air-blast equal in amount to from one-tenth to one-half of the total air requirement of the process, depending principally upon the nature of the heavy oil used. The greater portion or all of the reverse-air-blast gases thus produced are discharged to the atmosphere or delivered to waste heat recovery apparatus. In general, the total air requirement of the process (which includes both forward- and reverse-air-blasting, and both primary and secondary air) will not differ materially from the air requirement of the conventional carbureted water gas process of the past in which gas oil was used for carbureting purposes and from 30 to 40 cu. ft. of air per pound of steam were employed.

By reason of the fact that the amount of reverse-air-blast according to our process constitutes a large portion of the total air-blasting or blow period it will be obvious that where the reverse-air-blast gases are removed through the ports 61 and the manifold connection 60, the air-steam ratio insofar as the lower portions of the fuel bed 6 are concerned, may be considerably lower than that employed heretofore. Our experience has indicated that this does not always have a harmful effect upon generator fuel bed conditions, but where it is desired to maintain the lower portion of the fuel bed at a high temperature and still retain the advantages of removing the reverse-air-blast gases at an intermediate level in the fuel bed, and especially where a self-clinkering grate device is employed, a regenerator may be placed in the connection 22 contiguous to the base of the generator 1.

Such a regenerator is effective to absorb heat from the downrun gases leaving the base of the generator and to transfer such heat to air or steam about to enter the generator for upward passage through the fuel bed 6. It will be understood that either the primary air blast alone or the uprun steam alone or both may be passed through this regenerator which is thus particularly effective where a self-clinkering generator is employed and there is no relatively large and cool ash zone at the bottom of the fuel bed 6.

To provide for increasing the air-steam ratio in the bottom of the fuel bed during a reverse-air-blast period in which the air-blast gases are withdrawn through the ports 61 and the manifold 60 and pass out through the stack valve 63 to the atmosphere or through the valve 65 to the waste heat boiler, as the case may be, we may, however, employ a simultaneous forward blast through the lower portion of the generator.

According to this feature of our invention, air blast is introduced simultaneously to the bottom of the generator through the valve 33 and to the top of the superheater through the valve 37. The air blast from the valve 33 passes upward through the fuel bed to the level of the ports 61 where it meets the reverse-air-blast introduced through the valve 37 and the combined forward-air-blast and reverse-air-blast gases pass through the connection 62 to the atmosphere or to the waste heat boiler, as desired.

Where this simultaneous forward- and reverse-air-blast is contemplated, the type of reversing valve shown at 27 in Fig. 1 cannot be employed and it is necessary in this instance to employ a valve arrangement for the conduits 21 and 26 which is capable of positively closing either one of these conduits, while the other remains open, and also capable of positively closing both conduits simultaneously. In Fig. 3 we have illustrated suitable apparatus for this purpose. In this apparatus, the reversing valve 27 is dispensed with and separate valves 70 and 71 are provided in the conduits 21 and 26, respectively.

When forward-air-blasting alone is employed and during the steam uprun period, the valve 71 in conduit 26 is closed while the valve 70 in conduit 21 may be kept open. When reverse-air-blasting alone is employed and during the steam backrun or downrun period, the valve 70 is closed and the valve 71 is kept open. However, when forward-air-blast and reverse-air-blast are simultaneously employed as just described hereinabove, both valves 70 and 71 are closed.

When this procedure is followed, it will be obvious that the operating cycle can be considerably shortened because of the fact that the reverse-air-blast period "overlaps" the forward-air-blast period, which in turn greatly increases the capacity of the set as compared with operating conditions when forward-air-blasting and reverse-air-blasting operations are conducted separately.

It will be apparent from the above that our invention accomplishes the various objects set forth hereinabove, making it possible to manufacture carbureted water gas from heavy oil without loss of capacity and with exceptionally good oil and fuel economy and numerous other advantages while avoiding the disadvantages inherent in the methods and apparatus of the prior art. For the reasons above set forth the utility of our invention is therefore exceedingly great.

It will be apparent to those skilled in the art that our invention is not limited to the details of the specific methods set forth hereinabove by way of illustrative example but is to be construed as of the scope of the claims hereinafter made.

We claim as our invention:

1. The process of manufacturing water gas which consists in alternately introducing an air blast and a steam run into the fuel bed of a gas generator, and admitting heavy oil into the top of the generator simultaneously with the steam run to enrich the resulting gas, said air blast being introduced in a reverse direction into the generator and downwardly through at least the upper portion of the fuel bed to consume carbonaceous deposits resulting from the admission of said heavy oil, and withdrawing the air blast from the generator at a point below the top of the fuel bed.

2. The process of manufacturing carbureted water gas which consists in alternately introducing an air blast and a steam run into the fuel bed of a gas generator, and admitting heavy oil into the top of the generator simultaneously with the steam run to enrich the resulting gas, said air blast being introduced in a reverse direction into the generator and downwardly through the upper portion only of the fuel bed to form air blast gas and to consume carbonaceous deposits resulting from the admission of said heavy oil, and withdrawing the air blast from the generator circumferentially thereof at a point intermediate of the fuel bed where the carbon monoxide content of the air blast gas is at a minimum.

3. The process of manufacturing carbureted water gas which consists in alternately introducing an air blast and a steam run into the fuel bed of a gas generator, and admitting heavy oil into the top of the generator and into the carburetor simultaneously with the steam run to enrich the resulting gas, said air blast being introduced into the carburetor and thence in a reverse direction into the generator and downwardly through the upper portion only of the fuel bed to consume carbonaceous deposits in said carburetor and at the top of the fuel bed in the generator resulting from the admission of said heavy oil, and withdrawing the air blast from the generator circumferentially thereof at a point immediately below the top of the fuel bed where the carbon monoxide content of the air blast gas is at a minimum.

4. The process of manufacturing carbureted water gas which consists in alternately introducing a reverse air blast downwardly through and a steam run upwardly through the fuel bed of a gas generator, and admitting heavy oil into the top of the generator simultaneously with said steam run to enrich the resulting gas, said air blast being passed downwardly through the upper portion only of the fuel bed to consume carbonaceous deposits at the top of the fuel bed resulting from the admission of said heavy oil, and withdrawing the air blast from the generator circumferentially thereof at a point immediately below the top of the fuel bed where the carbon monoxide content of the air blast gas is at a minimum.

5. The process of manufacturing water gas which consists in first passing a forward air blast through the generator and thence through the carburetor and superheater of a gas making set to obtain the desired high temperature conditions, then changing the direction of said air blast through said elements in reverse order to consume surplus carbon deposits therein and discharging said reverse blast from the generator after having traversed a portion only of the fuel bed therein, then passing steam through said generator fuel bed and thence through said carburetor and superheater to make gas, and introducing heavy oil into the top of said generator coincidently with the steam run to enrich the gas, whereby the tarry deposits in the fuel bed resulting from the admission of said oil are consumed and removed by the next succeeding reverse air blast without necessitating the passage of the latter through the entire fuel bed in the generator.

6. The process of making carbureted water gas which consists in passing steam through the incandescent fuel bed in a gas generator first in a forward and then in a reverse direction through the generator, carburetor and superheater of the gas making set, admitting heavy oil into the top of the generator coincidently with the forward and reverse steam runs to enrich the made gas, then passing a blast of air first forwardly and then in a reverse direction through the generator, carburetor and superheater, to revivify the fuel bed in the generator and to remove carbon deposits in the elements of the set, said reverse air blast removing all heavy oil residue in the top of the fuel bed resulting from the said steam runs and being discharged from the generator at a point intermediate the fuel bed where the air blast gas contains a minimum of carbon monoxide.

7. The process of making carbureted water gas which consists in passing steam through the incandescent fuel bed in a gas generator first in a forward and then in a reverse direction through the generator and carburetor of a gas making set, admitting heavy oil into the top of the generator and separately into said carburetor coincidently with the forward and reverse steam runs to enrich the made gas, then passing a blast of air first forwardly and then in a reverse direction through the generator and carburetor in conjunction with secondary air simultaneously admitted to the carburetor, to revivify the fuel bed in the generator and to remove carbon deposits therein and in said carburetor, said reverse air blast consuming substantially all heavy oil residue in the top of the fuel bed resulting from the said steam runs and being discharged from the generator circumferentially thereof at a point immediately below the top of the fuel bed where the air blast contains a small carbon monoxide content.

GERALD J. NORDMEYER.
THOMAS W. STONE.